United States Patent Office 3,390,571
Patented July 2, 1968

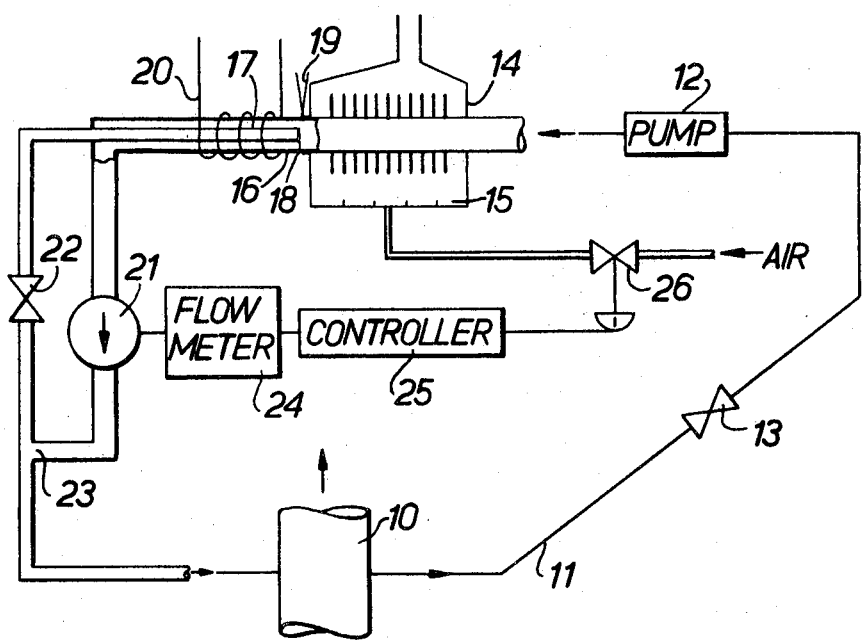

3,390,571
LIQUID METAL MONITOR
Peter Francis Roach, Warrington, and Daniel Fraser Davidson, Altrincham, England, assignors to United Kingdom Atomic Energy Authority, London, England
Filed Oct. 4, 1965, Ser. No. 492,378
Claims priority, application Great Britain, Oct. 26, 1964
43,659/64
6 Claims. (Cl. 73—61)

ABSTRACT OF THE DISCLOSURE

A liquid metal monitor for estimating an impurity in a liquid metal stream and having an orifice in a liquid metal flow path, which orifice can be at least partly plugged by precipitate from liquid metal in the flow path. At the orifice, liquid metal flow is divided into two parts so that subsequently one of the parts passes through, and the other part by-passes, the orifice.

---

This invention relates to liquid metal monitors used for estimating the impurity content (mainly oxygen) in a liquid metal stream. The invention is concerned with monitors known as "plugging meters." Such meters rely on the fact that there is a known relationship between temperature and the solubility of the impurity in the liquid metal. The temperature is measured at which impurity begins to precipitate or at which it begins to redissolve, that is to say, the saturation temperature. A flow of hot liquid metal is established through a cooler and then through an orifice. If the temperature of the liquid passing through the orifice is progressively reduced while the flow rate is continuously measured a reduction in flow indicates that the orifice is being partially blocked or "plugged," by particles of impurity. The liquid metal temperature at the orifice when plugging is apparent only approximates to the saturation temperature if the cooling is slow. As a consequence an unplugging run is carried out (where the temperature of the liquid through the partially blocked orifice is slowly raised) to obtain a second temperature reading (of "unplugging") which is used with the first temperature reading to give a mean temperature which is taken as the true saturation temperature.

A continuous indication of saturation temperature could be obtained if the temperature at the orifice were controlled so that the flow is a fixed fraction of the unplugged flow. In practice this is difficult to do, either manually or by automatic control, because of certain undesirable characteristics in the control loop. A reduction in flow due to plugging is accompanied immediately, without changing the rate of cooling, by a reduction in temperature at the outlet of the cooler. This causes a control overshoot which the operator, or control system, has to try to correct for by reducing the rate of cooling. If a time lag exists between the controller altering the cooling rate and sensing cooler outlet temperature, and undesirable "hunting" can occur between cooling rate alteration and temperature sensing. According to the present invention a liquid metal monitor comprises an orifice in a liquid metal flow path which orifice can be at least partly plugged by impurity precipitated from liquid metal in the flow path characterised in that immediately prior to the orifice means are provided for dividing liquid metal flow into two parts so that subsequently one of the parts passes through, and the other part bypasses, the orifice.

The bypass stream may provide that changes of flow through the plugging orifice do not cause corresponding changes through the cooler.

An embodiment of the invention will now be described with reference to the accompanying drawing which is a diagram of a liquid metal circuit.

The drawing shows a liquid metal monitor for sampling a liquid metal in a main 10. A continuous liquid metal sample is drawn along line 11 by pump 12 through a valve 13. The sample is thereafter driven through a cooler 14 which is externally finned and cooled by a flow of cold air from vents 15. The sample then passes through a first tube 16 which carries coaxially within it a second tube 17 which defines an annular orifice 18. The first tube 16 is surrounded, beyond the orifice 18 by a heater 20. A thermocouple 19 is provided to measure the temperature of the sample at the orifice 18. The sample is split into two parts at the orifice and then continues as separate, but coaxial streams. The first stream is that which passes through the orifice 18 and then through a flowmeter head 21. The second stream is that which passes through the second tube 17 and then through a valve 22. The two streams rejoin at the junction 23 to form a single flow which is then returned to the main 10. The signal output from the flowmeter head 21 passes to flowmeter 24 and therefrom a control signal is passed to a valve controller 25 which governs the flow of cooling air on output from vents 15 by way of valve 26.

In operation flow fluctuations in the line 11 caused by varying metal flow in the main 10 are smoothed by having the valve 13 acting as a strong restriction and the pump 12 set for delivering a high pressure. This arrangement ensures a steady flow through the cooler 14. A sample drawn from the main 10 by the pump 12 is driven through the cooler 14 where its temperature is progressively lowered by cold air blown over the fins. On arriving at the orifice 18 the flow splits into the two streams. The first stream, passing through the orifice 18, will precipitate solid matter therein if the sample has been cooled sufficiently (to at least saturation temperature) in the cooler 14. The resultant partial blockage of the orifice will disturb the flow through the flow meter head 21 and when such disturbance occurs the temperature registered by the thermocouple 19 is noted automatically by means not shown. As previously mentioned this temperature at which precipitation occurs is a measure of the amount of impurities present in the sample. The flow head 21 supplies information to the meter 24 and the controller 25. As long as no blockage occurs at the orifice the valve 26 is controlled to cause increased cooling of the sample through the cooler 14. When partial blockage does eventually occur the air flow is reduced to allow the temperature of the liquid metal to rise so as to clear the blockage. The heater 20 warms the stream after the orifice to ensure that the orifice region is the coolest place in the system and consequently the only place where precipitation and blocking will occur. The second stream, passing through the second tube 17 passes on through the valve 22 which acts as a constriction to allow a split into two substantially equal streams at the orifice. The streams mix at junction 23 and are then restored to the main 10.

The invention ensures that a continuous supply of fresh liquid metal passes the orifice for redissolving a complete plug should it accidentally occur.

We claim:

1. A device for measuring impurity content in a liquid metal which comprises a heat exchanger, means to pass a first liquid metal stream through said heat exchanger, means to divide said first liquid metal stream leaving said heat exchanger to provide second and third liquid metal streams each constituted by part of said first liquid metal stream, flow restrictor means to receive said second liquid metal stream, conduit means to receive said third liquid metal stream to by-pass said flow restrictor means, temperature sensing means to determine liquid metal temperature at the region of said flow restrictor means, the flow rate of said second liquid metal stream passing through said flow restrictor means being dependent upon accumulation at said flow restrictor means of impurity precipitated from said first liquid metal stream in said heat exchanger.

2. A device according to claim 1 wherein said means to divide said first liquid metal stream comprises coaxial ducts downstream of said heat exchanger, said flow restrictor means comprising an orifice disposed in the annular space between said coaxial ducts.

3. A device according to claim 1 wherein said flow restrictor means comprises an orifice and including means to detect flow rate of said second liquid metal stream passing through said orifice.

4. A device according to claim 3 including means to regulate the flow rate of a heat exchange medium through said heat exchanger.

5. A device according to claim 1 including means to heat said second liquid metal stream downstream of said flow restrictor means.

6. A method for determining the amount of an impurity in a liquid metal stream comprising the steps of continuously passing a liquid metal stream through a heat exchanger, passing a heat exchange medium through said heat exchanger at a rate to control the extent of precipitation of impurity in the liquid metal stream therein, separating the liquid metal stream downstream of the heat exchanger to provide a second liquid metal stream and a separate, third liquid metal stream, passing said second liquid metal stream through a flow restrictor, passing said third liquid stream through conduit means by-passing said flow restrictor, determining the flow rate of said second stream downstream of said flow restrictor, controlling the rate of flow of said heat exchange medium through said heat exchange medium to regulate the amount of precipitation of said impurity in said liquid metal, and measuring the temperature of said second fluid metal stream at the region of said flow restrictor, the flow of said first liquid metal stream being at least substantially constant irrespective of the extent of plugging of said flow restrictor caused by accumulation of said impurity.

References Cited

UNITED STATES PATENTS 3,222,916   12/1965   Davis _____ 73—15

FOREIGN PATENTS 1,369,423   7/1964   France.

DAVID SCHONBERG, *Primary Examiner.*